US012686740B2

(12) United States Patent
Kosal et al.

(10) Patent No.: US 12,686,740 B2
(45) Date of Patent: *Jul. 21, 2026

(54) STRUCTURAL BONDING ADHESIVE

(71) Applicant: Zephyros, Inc., Romeo, MI (US)

(72) Inventors: David Kosal, Romeo, MI (US); Michael Czaplicki, Romeo, MI (US); Yuan Lu, Romeo, MI (US)

(73) Assignee: Zephyros, Inc., Romeo, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/961,600

(22) Filed: Nov. 27, 2024

(65) Prior Publication Data

US 2025/0092185 A1 Mar. 20, 2025

Related U.S. Application Data

(63) Continuation of application No. 17/287,350, filed as application No. PCT/US2019/058552 on Oct. 29, 2019, now Pat. No. 12,187,842.

(60) Provisional application No. 62/751,786, filed on Oct. 29, 2018.

(51) Int. Cl.

| | |
|---|---|
| ***C08L 63/00*** | (2006.01) |
| ***C08G 59/18*** | (2006.01) |
| ***C08G 59/24*** | (2006.01) |
| ***C08G 85/00*** | (2006.01) |
| ***C08K 5/18*** | (2006.01) |
| ***C09J 163/00*** | (2006.01) |
| *C08L 21/00* | (2006.01) |
| *C08L 81/04* | (2006.01) |

(52) U.S. Cl.

CPC ......... *C08G 59/186* (2013.01); *C08G 59/245* (2013.01); *C08G 85/004* (2013.01); *C08K 5/18* (2013.01); *C08G 2170/00* (2013.01); *C08L 21/00* (2013.01); *C08L 81/04* (2013.01); *C08L 2207/53* (2013.01)

(58) Field of Classification Search

None

See application file for complete search history.

(56) References Cited

U.S. PATENT DOCUMENTS

| | | | | |
|---|---|---|---|---|
| 3,944,631 | A | 3/1976 | Yu | |
| 3,984,497 | A | 10/1976 | Owens | |
| 4,034,013 | A | 7/1977 | Lane | |
| 4,096,202 | A | 6/1978 | Farnham | |
| 4,304,709 | A | 12/1981 | Salee | |
| 4,306,040 | A | 12/1981 | Baer | |
| 4,495,324 | A | 1/1985 | Chacko | |
| 4,536,436 | A | 8/1985 | Maeoka | |
| 5,275,853 | A | 1/1994 | Silvis | |
| 5,464,924 | A | 11/1995 | Silvis | |
| 5,962,093 | A | 10/1999 | White | |
| 10,234,902 | B2 | 3/2019 | Delaporte | |
| 10,386,287 | B2 | 8/2019 | Otsuka | |
| 12,187,842 | B2 * | 1/2025 | Kosal | C08G 59/182 |
| 2002/0164485 | A1 | 11/2002 | Martin | |
| 2008/0188609 | A1 | 8/2008 | Agarwal et al. | |
| 2010/0272908 | A1 * | 10/2010 | Sturgill | C09J 163/00 523/400 |
| 2011/0098382 | A1 | 4/2011 | Czaplicki et al. | |
| 2012/0129980 | A1 | 5/2012 | Desai et al. | |
| 2012/0211160 | A1 | 8/2012 | Asay | |
| 2016/0083633 | A1 * | 3/2016 | Desai | C08G 59/184 525/65 |
| 2017/0240774 | A1 * | 8/2017 | Devanne | C09J 163/00 |

FOREIGN PATENT DOCUMENTS

| | | | |
|---|---|---|---|
| CN | 104053694 | A | 9/2014 |
| EP | 3281965 | A1 | 2/2018 |
| WO | 2016/151093 | A1 | 9/2016 |

OTHER PUBLICATIONS

Chinese Office Action dated Feb. 27, 2023, Application No. 201980072079.X.
PCT International Search Report & Written Opinion dated Jan. 28, 2020, Application No. PCT/US2019/058552.
India First Exam Report dated Oct. 31, 2022, Application No. 202117018835.

* cited by examiner

*Primary Examiner* — Michael J Feely
(74) *Attorney, Agent, or Firm* — The Dobrusin Law Firm, P.C.

(57) ABSTRACT

A material comprising an epoxy/elastomer adduct, a polymeric particle, from about 0.05 to about 20 weight percent of an epoxy/diacid adduct, and optionally, an amine reaction product.

21 Claims, 1 Drawing Sheet

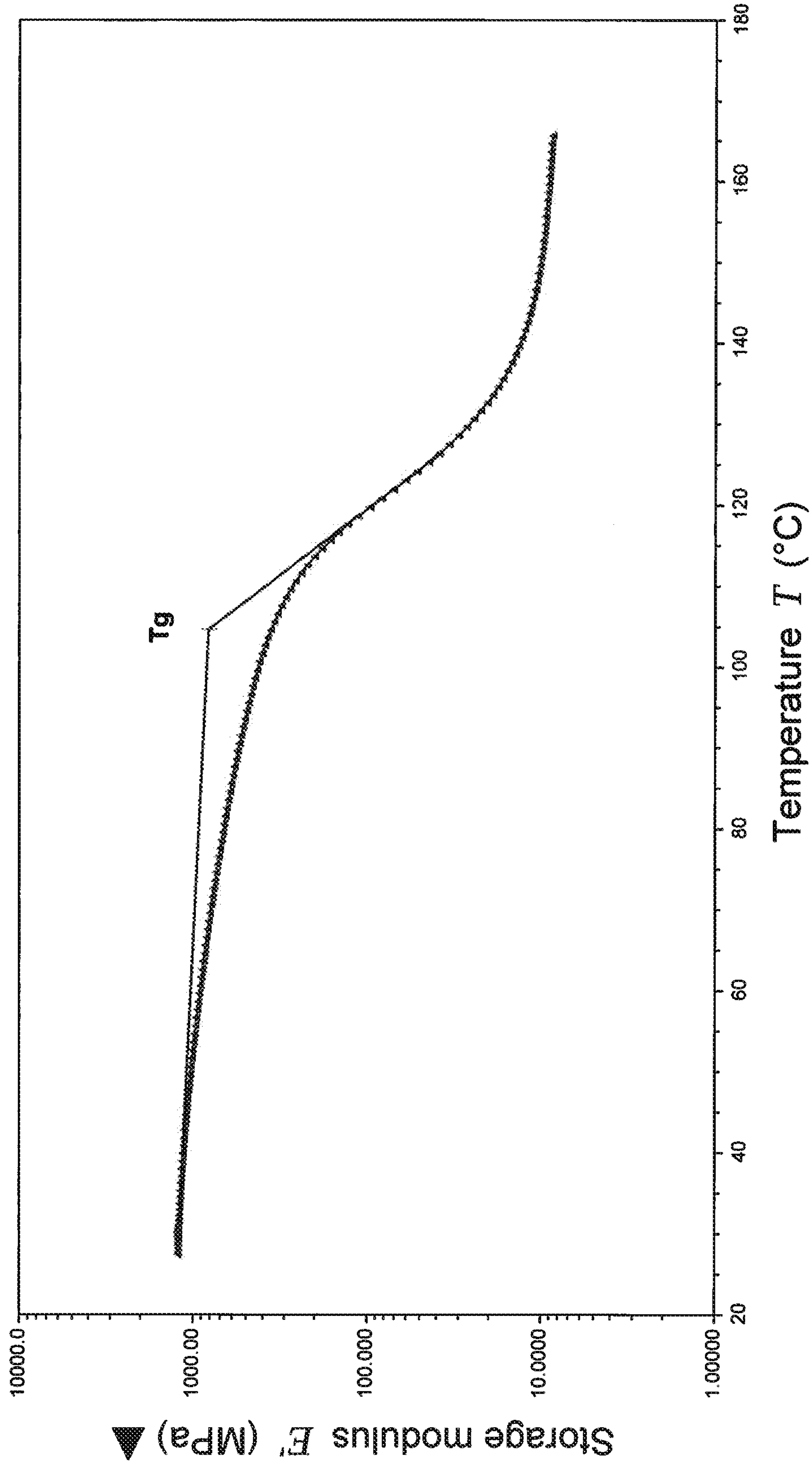
Tg
Temperature T (°C)
20
40
60
80
100
120
140
160
180
Storage modulus E' (MPa)
10000.0
1000.00
100.000
10.0000
1.00000

STRUCTURAL BONDING ADHESIVE

FIELD OF THE INVENTION

The present teachings relate generally to an activatable material, a method of forming the activatable material and a method of using the activatable material for adhering components of articles of manufacture such as automotive vehicles. The activatable material provides improved adhesion to individual substrates, especially when exposed to environmental stresses, improved adhesion between dissimilar substrates, improved fracture toughness, improved strain to failure and improved adhesion durability.

BACKGROUND OF THE INVENTION

For many years, industry, particularly the transportation industry, has been concerned with adhesion and reinforcement of articles of manufacture such as automotive vehicles. A particular concern being the production of lightweight, energy efficient vehicles in response to the pressures of government regulations and other industry wide demands. In turn, industry has developed a wide variety of activatable adhering and sealing materials for providing such lightweight, improved fuel economy vehicles. One approach to reducing vehicle weight includes replacing heavy components with counterparts composed of materials that are lighter than those currently used, for example replacing galvanized steel with aluminum or polymer composites.

In addition, multi-material bonding (such as steel to aluminum) often requires fastening means that are different from traditional welding. Dissimilar materials present significant challenges to traditional welding processes, therefore adhesives are often utilized in place of welds. To meet the needs presented in bonding dissimilar materials, these adhesives are often required to have highly specific physical properties while also adhering to a variety of different substrates.

One concern with the use of such adhesives is the large disparity in coefficients of thermal expansion between components comprised of different materials. For instance, the coefficient of thermal expansion of aluminum is approximately two times greater as compared to steel. Consequently, problems arise such as delamination, warpage, flaw propagation or other types of assembly distortion when automotive vehicles are heated to cure coatings and adhesives. As such, a suitable adhesive material must have sufficient strain to failure to compensate for increased relative displacement from differences in the coefficients of thermal expansion of materials bonded to one another.

Another concern when dissimilar metals are in proximity to one another is the galvanic corrosion (e.g., as a result of ion transfer that may occur when the interface of the two metals is exposed to the environment (e.g. hot, wet, and corrosive environments). Consequently, a suitable activatable material must have sufficient adhesion durability in hot, wet, and corrosive environments.

Some of the other desirable properties for these materials include high fracture toughness, appropriate tensile modulus, improved wash-off resistance prior to activation (e.g., in its green state), and improved ease of dispensing when the material is located onto a surface prior to activation. These properties, including strain to failure and adhesion durability, have a generally inverse relationship where an increase in one follows a decrease in the other. It is thus a significant challenge to provide simultaneous improvement to both of these properties.

The present teachings, therefore, seek to provide a material having post-activation improved strain to failure, adhesion, T-peel and wedge impact, and/or durability while maintaining appropriate tensile modulus (e.g., a fairly consistent modulus over a temperature range of −40° C. to 80° C.), dispensing ease and wash-off resistance (prior to activation) as compared to existing activatable materials.

SUMMARY OF THE INVENTION

The teachings herein provide for a material comprising an epoxy/elastomer adduct, a polymeric particle, from about 0.05 to about 20 weight percent of an epoxy/diacid adduct, and optionally, an amine reaction product.

The material may have a T-peel of at least 14. The material may have a strain to failure of greater than 8%. The material may have a glass transition temperature as defined by ASTM D7028-07 of at least 80° C. The material may include an amine reaction product. The epoxy/elastomer adduct may comprise a polydisulfide polymer. The epoxy elastomer adduct may be present in an amount of at least about 5% but less than about 50% by weight or even at least about 15% but less than about 30% by weight. The polymeric particle may be present in an amount of at least about 3% but less than about 60% by weight or even at least about 27% but less than about 32% by weight. The epoxy/diacid adduct may be present in an amount of from about 0.2% to about 15% by weight or even from about 2% to about 5% by weight.

The amine reaction product may be present in an amount of from about 0.01% to about 15% by weight or even from about 0.5% to about 5% by weight. The amine reaction product may be present in a sufficient amount so that the material displays a T-Peel strength of about 6 N/mm to about 30 N/mm. The amine reaction product may be chosen from 1-naphthylamine, 2-naphthylamine, ethanolamine, phenethylamine, oleylamine or a combination thereof. The amine reaction product may be adducted with an epoxy.

The material may comprise phenoxy dissolved in an epoxy resin in the range of about 2% to about 10% by weight of the material. The material may comprise silane-modified epoxy resin in the range of about 8% to 18% by weight of the material.

The material may include a curing agent. The material may include a flexibilizer. An epoxy component of the epoxy/diacid adduct may include bisphenol-F diglycidyl ether (DGEBF) epoxy. The diacid component of the epoxy/diacid adduct may be one or more of a C18 or C36 diacid. The epoxy may be chosen from a bisphenol-F diglycidyl ether (DGEBF) epoxy, a silane-modified epoxy, or a combination thereof.

The material may have a strain to failure of at least 16%. The material may have a modulus of at least 900 MPa.

The polymeric particle may include core modifiers of polybutadiene, styrene-butadiene rubber, or a combination thereof. The polymeric particle may include core/shell rubber particles averaging about 100-200 nm in size. The polymeric particle may be substantially free of agglomerated particles. The elastomer in the epoxy/elastomer adduct may be selected from, polydisulfide polymer, CTBN, ETBN, Epoxonic 328 or any combination thereof.

The material may include a curing accelerator in the range of about 0.5% to about 5.0% by weight of the material. The material may include a curing agent in the range of about 2% by weight to about 7% by weight of the material. The material when cured may exhibit a tensile modulus from about 900 MPa to about 1700 MPa. The material when cured may exhibit a lap shear strength of at least about 20 MPa. The material may exhibit a T-Peel strength when cured from about 6 N/mm to about 18 N/mm.

The material may include one or more reinforcement components. The one or more reinforcement components may be selected from silica, diatomaceous earth, glass, clay (e.g., including nanoclay), glass beads or bubbles, carbon or ceramic fibers, nylon, aramid or polyamide fibers (e.g., Kevlar), pyrophyllite, sauconite, saponite, nontronite, wollastonite, or montmorillonite. The material may include a silica and/or calcium-based reinforcement component. The silica-based reinforcement component may be fumed silica.

The ratio of the epoxy/elastomer adduct to the reinforcement component may be from about 1 to 30 parts epoxy/elastomer adduct to about 1 to 4 parts reinforcement component. The ratio of the epoxy/elastomer adduct to the reinforcement component may be from about 15 to 30 parts epoxy/elastomer adduct to about 1 to 2 parts reinforcement component. The ratio of the epoxy/elastomer adduct to the epoxy/diacid adduct may be from about 1 to 6 parts epoxy/elastomer adduct to about 1 to 4 parts epoxy/diacid adduct. The ratio of the epoxy/elastomer adduct to the epoxy/diacid adduct may be from about 3 to 7 parts epoxy/elastomer adduct to about 1 to 3 parts epoxy/diacid adduct. The ratio of epoxy/diacid adduct to amine reaction product may be from about 1 to 12 parts epoxy/diacid adduct to about 1 to 3 parts amine reaction product.

The teachings herein are also directed to a material comprising less than about 30% by weight of a polymeric particle including core/shell rubber particles dispersed in epoxy resin, the core/shell rubber particles present in a concentration of at least 20% of the polymeric particle, an epoxy/elastomer adduct, an amine reaction product.

The material may include a silane-modified epoxy resin. The material may include a reinforcement component. The material may include an epoxy/diacid adduct. The material may have a strain to failure of greater than 8% and a modulus of at least 900 MPa. The material may include a curing agent. The material may contain from about 15% to about 30% by weight of epoxy/elastomer adduct. The material may have a strain to failure of at least 16%. The material may have a modulus of at least 1100 MPa. The ratio of epoxy/elastomer adduct to silane-modified epoxy resin may be about 1 to 20 parts epoxy/elastomer adduct to about 1 to 13 parts silane-modified epoxy resin. The ratio of the epoxy/elastomer adduct to the reinforcement component is from about 1 to 30 parts epoxy/elastomer adduct to about 1 to 4 parts reinforcement component.

The teachings herein are further directed to use of the materials described herein as an adhesive. The teachings herein are also directed to use of the materials described herein for adhering members in a transportation vehicle. The teachings herein are further directed to use of the materials described herein for adhering steel to aluminum. The teachings herein are also directed to use of the materials described herein for adhering steel to polymer composite, or for adhering aluminum to polymer composite.

The teachings herein also contemplate a method for adhering a first substrate to a second substrate including: applying the material of any of the preceding claims to the first substrate; then contacting the material to the second substrate after activating the material; and activating the material.

BRIEF DESCRIPTION OF THE DRAWINGS

FIG. 1 shows a graph depicting storage modulus as a function of temperature for identifying the glass transition temperature of an exemplary material in accordance with the present teachings.

DETAILED DESCRIPTION

The explanations and illustrations presented herein are intended to acquaint others skilled in the art with the present teachings, its principles, and its practical application. The specific embodiments of the present teachings as set forth are not intended as being exhaustive or limiting of the present teachings. The scope of the present teachings should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description. Percentages herein refer to weight percent, unless otherwise indicated.

This application is related to U.S. Provisional Application Ser. No. 62/751,786, filed Oct. 29, 2018, the contents of that application being hereby incorporated by reference herein for all purposes.

The present teachings are predicated upon provision of an improved material (e.g., an activatable material), and articles incorporating the same. The activatable material may assist in providing adhesion upon a surface of a structure, or to one or more structural members of an article of manufacture. As used herein, the phrase activatable material includes any material that may be activated to melt, flow, cure (e.g., thermoset), or a combination thereof by an ambient condition or another condition. For example, the material may flow, melt, cure, a combination thereof or the like upon exposure to a condition such a heat, pressure, chemical exposure, combinations thereof or the like.

The activatable material typically includes an epoxy/elastomer adduct, a polymeric particle, an epoxy/diacid adduct, an amine reaction product, a flexibilizer, phenoxy resin, a curing agent, a curing accelerator, and one or more reinforcing fillers.

The activatable material of the present teachings may be applied to various articles of manufacture for adding structural integrity to portions or members of the articles. Examples of such articles of manufacture include, without limitation, household or industrial appliances, furniture, storage containers, buildings, structures, or the like. The activatable material may be applied to portions of transportation vehicles including boats, trucks, trains, airplanes, automotive vehicles or the like. The material may be utilized in an automotive vehicle, such as with body or frame members (e.g., a vehicle frame rail) of the automotive vehicle.

The material may be formulated to include an adduct, which may be an epoxy/elastomer adduct. The epoxy/elastomer adduct imparts flexibility and the ability to create a separate phase when cured to the activatable material and the ability to absorb energy during plastic deformation and can impart the ability to create phase separation. Such phase separation can improve fracture toughness. Various adducts may be employed in the present teachings. The epoxy/elastomer adduct may be included in an amount of up to about 75% by weight of the activatable material. The epoxy/elastomer adduct may be approximately at least about 5% by weight, more typically at least about 10% by weight, more typically at least about 15% by weight, and even more typically at least about 20% by weight of the activatable material. The epoxy/elastomer adduct may be approximately about 75% or less by weight, more typically about 70% or less by weight, more typically about 65% or less by weight, and even more typically 60% or less by weight of the activatable material. The epoxy/elastomer adduct may be a combination of two or more particular adducts. The adducts may be solid adducts, liquid adducts or semisolids at a temperature of 23° C. or may also be some combination thereof. It is possible that the adduct is composed substantially (i.e., at least 70%, 80%, 90% or more) of one or more adducts that are solid at a temperature of 23° C. The adduct, (if solid) may be in the form of a dissolution to facilitate simplified incorporation during mixing operations. The adduct may be used together with polymeric particle, such as a core/shell material, styrene-butadiene rubber (SBR) or polybutadiene (PBd), an epoxy/diacid adduct, and an amine reaction product, which may achieve desirable adhesive performance and physical properties over a wide range of temperatures, even when employing a relatively small amount of the adduct.

The adduct itself generally includes about 1:5 to 5:1 parts of epoxy to elastomer, and more preferably about 1:3 to 3:1 parts of epoxy to elastomer. More typically, the adduct includes at least about 10%, more typically at least about 20% and or even at least about 30% elastomer and also typically includes not greater than about 60%, although higher or lower percentages are possible. The elastomer compound suitable for the adduct may be a thermosetting elastomer, although not required. Exemplary elastomers include, without limitation, natural rubber, SBR (styrene-butadiene rubber), polyisoprene, polyisobutylene, PBd (polybutadiene), isoprene-butadiene copolymer, neoprene, nitrile rubber, butyl rubber, carboxyl-terminated polymer, (e.g. carboxyl functional butadiene-acrylonitrile), polydisulfide polymer, acrylic elastomer, acrylonitrile elastomers, silicone rubber, polysiloxanes, polyester rubber, diisocyanate-linked condensation elastomer, EPDM (ethylene-propylene diene rubbers), carboxyl-terminated polymer, carboxyl-terminated butadiene-acrylonitrile (CTBN) chlorosulphonated polyethylene, fluorinated hydrocarbons and the like. Examples of additional or alternative epoxy/elastomer or other adducts suitable for use in the present teachings are disclosed in United States Patent Publication 2004/0204551.

An example of preferred adducts or preferred components for producing the epoxy/elastomer adduct, is an epoxidized polydisulfide polymer such as products sold under the tradenames Thioplast™ G and Thioplast™ EPS. Particularly preferred grades of epoxy/elastomer adducts are Thioplast™ G10 and Thioplast™ EPS-80, commercially available from Akzo Nobel. Another example is Hypro™ 1300X13NA (CTBN), commercially available from Emerald Performance Materials®, adducted with the diglycidyl ether of bisphenol-F. Yet another example of a preferred epoxy/elastomer adduct is Hypro™ 1300X63 (ETBN (glycidyl-ester of butadiene and butadiene-acrylonitrile)). Another example of a preferred epoxy/elastomer adduct can be produced utilizing Epoxonic 328.

The elastomer-containing adduct can be included to modify structural properties of the activatable material such as strength, strain-to-failure, fracture toughness ($G_{1C}$), peel, adhesion durability, stiffness, or other properties. CTBN may be particularly useful for developing adhesion to contaminated surfaces, especially with stamping lubricants typical to the automotive industry. The material may include a carboxyl-terminated polymer adduct. The carboxyl-terminated polymer adduct may impart an improved strain to failure of greater than about 2% or even greater than about 3% to the material post-activation.

For exemplary purposes, table A is produced below to illustrate an exemplary composition for creating the epoxy/elastomer adduct reaction product.

TABLE A

| Ingredient | Weight % |
|---|---|
| Hypro ™ 1300X13 NA | 40.00 |
| DGEBA (diglycidyl ether of bisphenol A) | 60.00 |
| Total | 100.00 |

Generally, it is preferable for the activatable material to include at least one type of polymeric particle. Such polymeric particles may be utilized to improve fracture toughness ($G_{1C}$), peel resistance and impact resistance. As used herein, the term "polymeric particle" is defined as a particle comprising a polymeric material. Like with any other ingredients of the present teachings, the term "polymeric particle" can include one or more polymeric particles. Various polymeric particles may be employed in the practice of the present teachings and often include one or more elastomers. It is generally preferable for the polymeric particles to be at least 4%, more typically at least 7%, even more typically at least 10%, still more typically at least 13% and even still more typically at least 16% by weight of the activatable material and also preferable for the polymeric particle to be less than 90%, more typically less than 40% an even more typically less than 30% by weight of the activatable material, although higher or lower amounts may be used in particular embodiments.

The polymeric particle may include one or more core/shell polymers which may be pre-dispersed in an epoxy. The process for forming the core shell materials in a liquid epoxy avoids agglomeration of the core shell particles as may be common with "dry" core shell polymeric particles (e.g., agglomeration may occur during the drying process). An example of products made by this process may be described in one or more of U.S. Pat. Nos. 3,984,497; 4,096,202; 4,034,013; 3,944,631; 4,306,040; 4,495,324; 4,304,709; and 4,536,436. The polymeric particles may be formed through an emulsion polymerization process. This process may include the addition of a solvent with the resin. As a result of incompatibility between the resin/solvent and water, the water settles out of the material as the core shell particles move into the resin, resulting in reduced agglomeration. Alternatively, a high-speed dispersion can be effective at de-agglomerating core/shell materials. However, surfactant may remain post spray drying or coagulating the core/shell material. This residual surfactant may be detrimental for the material's resistance to environmental exposure conditions that involve water such as salt spray and humidity. Materials not exposed to the environmental exposure conditions would typically not show a difference between dry and liquid provided that there is sufficient de-agglomeration of the dry material. The polymeric particle may include one or more core/shell polymers pre-dispersed in an epoxy such as a bisphenol-A type or bisphenol-F type epoxy.

As used herein, the term core/shell polymer may denote a polymeric material wherein a substantial portion (e.g., greater than 30%, 50%, 70% or more by weight) thereof may be comprised of a first polymeric material (i.e., the first or core material) that may be substantially entirely encapsulated by a second polymeric material (i.e., the second or shell material). The first and second polymeric materials, as used herein, may be comprised of one, two, three or more polymers that are combined and/or reacted together (e.g., sequentially polymerized) or may be part of separate or same core/shell systems. The core/shell polymer should be compatible with the formulation and preferably has a ductile core and a rigid shell which has favorable adhesion with the other components of the activatable material.

The first and second polymeric materials of the core/shell polymer can include elastomers, polymers, thermoplastics, copolymers, other components, or combinations thereof. The first polymeric material, the second polymeric material or both may include or may be substantially entirely composed of (e.g., at least 70%, 80%, 90% or more by weight) one or more thermoplastics. Exemplary thermoplastics include, without limitation, styrenics, acrylonitriles, acrylates, vinyl esters, polyamides, polyethylenes, PBd (polybutadienes), SBR (styrene-butadiene rubber), or combinations thereof.

Examples of useful core-shell graft copolymers may be those where hard containing compounds, such as styrene, acrylonitrile or methyl methacrylate, may be grafted onto a core made from polymers of soft or elastomeric compounds such as butadiene or butyl acrylate. U.S. Pat. No. 3,985,703, describes useful core-shell polymers, the cores of which are made from butyl acrylate but can be based on ethyl isobutyl, 2-ethylhexyl or other alkyl acrylates or mixtures thereof. The core polymer may also include other copolymerizable containing compounds, such as styrene, vinyl acetate, methyl methacrylate, butadiene, isoprene, or the like. The core polymer material may also include a cross linking monomer having two or more nonconjugated double bonds of approximately equal reactivity such as ethylene glycol diacrylate, butylene glycol dimethacrylate, and the like. The core polymer material may also include a graft linking monomer having two or more nonconjugated double bonds of unequal reactivity such as, for example, diallyl maleate and allyl methacrylate.

The shell portion may be polymerized from methyl acrylates such as methyl methacrylate and optionally other alkyl (meth)acrylates and (meth)acrylates, such as ethyl, butyl, or mixtures thereof. Up to 40 percent by weight or more of the shell monomers may be styrene, vinyl acetate, vinyl chloride, and the like. Additional core-shell graft copolymers useful in embodiments of the present teachings are described in U.S. Pat. Nos. 3,984,497; 4,096,202; 4,034,013; 3,944,631; 4,306,040; 4,495,324; 4,304,709; and 4,536,436. Examples of core-shell graft copolymers include, but are not limited to, MBS (methacrylate-butadiene-styrene) polymers, which are made by polymerizing methyl methacrylate in the presence of PBd (polybutadiene) or a polybutadiene copolymer rubber. The MBS graft copolymer resin may generally have a SBR (styrene-butadiene rubber) core and a shell of acrylic polymer or copolymer. Examples of other useful core-shell graft copolymer resins include, PBd (polybutadiene), ABS (acrylonitrile-butadiene-styrene), MABS (methacrylate-acrylonitrile-butadiene-styrene), ASA (acrylate-styrene-acrylonitrile), all acrylics, SA EPDM (styrene-acrylonitrile grafted onto elastomeric backbones of ethylene-propylene diene monomer), MAS (methacrylic-acrylic rubber styrene), and mixtures thereof.

Examples of useful polymeric particles include but are not limited to those sold under the tradename, Kane Ace™, commercially available from Kaneka Americas Holding, Inc. Particularly preferred grades of Kane Ace™ are sold under the designations MX-134 and MX-267. The polymeric particles may average no less than 50 nm and no greater than 300 nm in size. The polymeric particles may be from about 5% to about 30% by weight of the activatable material.

The material may include an epoxy/diacid adduct. The use of the term diacid can relate to any polyfunctional molecule having two carboxylic acid moieties. Some diacid compounds are introduced to an epoxy backbone to increase flexibility and toughness to formulations and the ability to phase separate. The diacid component of the epoxy/diacid adduct may be a C8-C40 or more, diacid compound that is adducted with an epoxy. The epoxy component of the epoxy/diacid adduct may be DGEBF (diglycidyl ether of bisphenol F). The diacids may be saturated or unsaturated. Preferably, the diacid is derived from an unsaturated fatty acid. An example of a preferred epoxy/diacid adduct is the product of the esterification of Epotec® 172LV (DGEBF) and a C18 diacid. Another example of a preferred epoxy/diacid adduct is YDF-HyPox® DA323 (DGEBA and dimer fatty acid adduct) available from Emerald Performance Materials®.

The adduct generally includes about 1:6 to 6:1 parts of diacid to epoxy and more preferably about 1:4 to 4:1 parts of diacid to epoxy. More typically, the adduct includes at least about 10%, more typically at least about 20% and even more typically at least about 40% diacid and typically includes not greater than about 60%, although higher or lower percentages are possible.

The material may include an amine reaction product. Such reaction product may be utilized to improve peel resistance and impact resistance, without having detrimental effects on other properties such as lap shear, modulus as measured by ASTM D7029-07, ultimate strength or others. The amine reaction product may include an amine moiety and a hydrophobic moiety. The hydrophobic moiety may be aliphatic, cyclic, or a combination thereof. The hydrophobic moiety may be C36 or less, C18 or less, C10 or less, or C4 or less. The amine reaction product may be selected to include one or more low molecular weight components. As one non-limiting example, the amine reaction product may include 1-naphthylamine, 2-naphthylamine, ethanolamine, phenethylamine, oleylamine, or a combination thereof. The amine reaction product may be adducted with epoxy. The amine reaction product may be adducted with bisphenol-F epoxy, silane-modified epoxy, or a combination thereof. An example of a suitable epoxy may include Epotec® YDF 172LV (DGEBF). Another example of a suitable epoxy may include Epokukdo KSR-177 (di-functional silane-modified epoxy resin). The amine reaction product may be adducted with epoxy before addition to the material. It is possible that high molecular weight components are selected so long as there is minimized deleterious effects on the viscosity of the material (e.g., so that the material can still flow as needed during an application process.

For exemplary purposes, table B is produced below to illustrate an exemplary composition for creating the amine reaction product with an epoxy.

TABLE B

| Ingredient | Weight % |
| --- | --- |
| 1-naphthylamine | 4.50 |
| Bisphenol-F epoxy | 2.00 |
| Silane-modified epoxy | 28.50 |
| Polymeric particle in liquid epoxy | 65.00 |
| Total | 100.00 |

The material may include a flexibilizer. The use of the term flexibilizer can relate to a single flexibilizer or a combination of multiple different flexibilizers. Although other flexibilizers may be employed, preferred flexibilizers include polymers that are amine modified, epoxy modified, urethane-modified or any combination thereof. These polymers can include thermoplastics, thermosets or thermosettables, elastomers, combinations thereof or the like. These polymers may be modified with urethane, aromatic or non-aromatic epoxy, and/or may be modified with bisphenol-F type, bisphenol-A type, combinations thereof or other type epoxy. An example of a preferred flexibilizer, which may be a phenol-terminated urethane based toughening agent, is Rez-Cure® EP 1820 (available from Innovative Resin Systems).

An example of other preferred flexibilizers are polyurethane modified epoxies sold under the tradenames GME-3210 and GME-3220, commercially available from GNS Technologies. Without being bound by theory, it is believed that when a polyurethane modified epoxy flexibilizer is included the activatable material may substantially maintain impact strength (e.g., impact resistance) at low temperatures, while minimizing the reduction of glass transition temperature (Tg) (e.g., as compared to other flexibilizers). Yet further examples of preferred flexibilizer are epoxy terminated polyethers or amine precursor to produce epoxy terminated polyethers, such as JEFFAMINE M series or SD series, commercially available from Huntsman and DER 732, commercially available from the Dow Chemical Company. Flexibilizers based on cashew nutshell liquid such as the epoxidized liquids Cardolite NC-514 and Cardolite Lite 2513 HP are also useful flexibilizers. All of the individual flexibilizers discussed herein may be used separately or in combination with each other in the material of the present invention, unless otherwise stated.

Typically, the flexibilizer is at least 1%, more typically at least 2% and even possibly at least 5% by weight of the material but is typically less than 50%, more typically less than 35% and even possibly less than 20% by weight of the material, although higher and lower values may also be possible unless otherwise stated.

The material described herein may include an epoxy resin. An epoxy resin may be added to the activatable material to increase the adhesion, flow properties or both of the material. One exemplary epoxy resin may be a phenolic resin, which may be a novolac type or other type resin. One example of a suitable epoxy resins is Epotec® YDF 172LV (DGEBF), available from Aditya Birla. Other preferred epoxy containing materials may include modified epoxy resins. The epoxy resins may be silane modified epoxy resins or silane free epoxy resins. For example, a silane modified epoxy resin may aid in allowing the activatable material to adhere to metal, such as to aluminum. The silane modified epoxy resin may be reaction product between at least one epoxy resin and a silane compound. An example of a suitable silane-modified epoxy resin is Epokukdo KSR-177 (di-functional silane-modified epoxy resin) available from Kukdo Chemical. Moreover, various mixtures of several different epoxy resins may be employed as well. Epoxy resins may be present in other formulation components such as the epoxy/elastomer adduct, the polymeric particle dispersion, and the epoxy/diacid adduct. The concentrations and type of epoxy resins present in the formulation components varies by manufacturer and the particular grade. The epoxy resins may be present in the formulation components as adducts, unreacted epoxy, or both.

The material may include a phenoxy resin component. Phenoxy resins are high molecular weight thermoplastic condensation products of bisphenol-A and epichloro-hydrin and their derivatives. The phenoxy resins that may be employed may be of the basic formula:

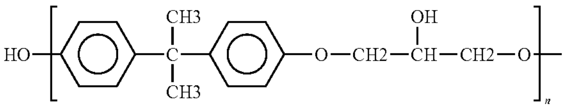

where n is typically from 30 to 100 preferably from 50 to 90. Modified phenoxy resins may also be used. Examples of phenoxy resins that may be used are products marketed by Gabriel Performance Products. Examples of suitable materials are the PKHB, PKHC, PKHH, PKHJ, PKHP pellets and powder. Alternatively, phenoxy/polyester hybrids and epoxy/phenoxy hybrids may be used. In order to enhance the production of the activatable material it is preferred that the phenoxy resin be supplied to the other components as a solution. While any solvent may be used it is particularly preferred to use a low molecular weight epoxy resin as the solvent as this can also contribute to the adhesive properties upon activation.

In certain embodiments, it may be desirable to include one or more thermoplastic polyethers and/or thermoplastic epoxy resins in the activatable material. When included, the one or more thermoplastic polyethers preferably comprise between about 1% and about 90% by weight of the activatable material, more preferably between about 3% and about 60% by weight of the activatable material and even more preferably between about 4% and about 25% by weight of the activatable material. As with the other materials, however, more or less thermoplastic polyether may be employed depending upon the intended use of the activatable material.

The thermoplastic polyethers typically include pendant hydroxyl moieties. The thermoplastic polyethers may also include aromatic ether/amine repeating units in their backbones. The thermoplastic polyethers of the present teachings preferably have a melt index between about 5 and about 300, more preferably between about 30 and about 250 grams per 10 minutes for samples weighing 2.16 Kg at a temperature of about 190° C. Of course, the thermoplastic polyethers may have higher or lower melt indices depending upon their intended application. Preferred thermoplastic polyethers include, without limitation, polyetheramines, poly(amino ethers), copolymers of monoethanolamine and diglycidyl ether, combinations thereof or the like.

According to one embodiment, the thermoplastic polyether is formed by reacting a primary amine, a bis (secondary) diamine, a cyclic diamine, a combination thereof or the like (e.g., monoethanolamine) with a diglycidyl ether or by reacting an amine with an epoxy-functionalized poly(alkylene oxide) to form a poly(amino ether). According to another embodiment, the thermoplastic polyether is prepared by reacting a difunctional amine with a diglycidyl ether or diepoxy-functionalized poly(alkylene oxide) under conditions sufficient to cause the amine moieties to react with the epoxy moieties to form a polymer backbone having amine linkages, ether linkages and pendant hydroxyl moieties. Optionally, the polymer may be treated with a monofunctional nucleophile which may or may not be a primary or secondary amine.

Additionally, it is contemplated that amines (e.g., cyclic amines) with one reactive group (e.g., one reactive hydrogen) may be employed for forming the thermoplastic polyether. Advantageously, such amines may assist in controlling the molecular weight of the thermoplastic ether formed.

Examples of preferred thermoplastic polyethers and their methods of formation are disclosed in U.S. Pat. Nos. 5,275,853; 5,464,924 and 5,962,093, which are incorporated herein by reference for all purposes. Advantageously, the thermoplastic polyethers can provide the activatable material with various desirable characteristics such as desirable physical and chemical properties for a wide variety of applications as is further described herein.

One or more curing agents and/or curing agent accelerators may be added to the activatable material. Amounts of curing agents and curing agent accelerators can vary widely within the activatable material depending upon the desired structural properties of the activatable material and the like. Exemplary ranges for the curing agents present in the activatable material range from about 2% by weight to about 7% by weight. Exemplary ranges for the curing agent accelerator present in the material ranges from about 0% to about 5% by weight.

Preferably, the curing agents assist the activatable material in curing by crosslinking of the polymers, epoxy resins or both. Useful classes of curing agents are materials selected from aliphatic or aromatic amines or their respective adducts, amidoamines, polyamides, cycloaliphatic amines, anhydrides, polycarboxylic polyesters, isocyanates, phenol-based resins (e.g., phenol or cresol novolak resins, copolymers such as those of phenol terpene, polyvinyl phenol, or bisphenol-A formaldehyde copolymers, bishydroxyphenyl alkanes or the like), or mixtures thereof. Particular preferred curing agents include modified and unmodified polyamines or polyamides such as triethylenetetramine, diethylenetriamine tetraethylenepentamine, cyanoguanidine, dicyandiamides and the like. An accelerator for the curing agents (e.g., a modified or unmodified urea such as methylene diphenyl bis-urea, an imidazole or a combination thereof) may also be provided for preparing the activatable material.

An example of a suitable curing agent may be a polyamide curing agent such as Amicure® CG 1200 (dicyanamide micronized curing agent) available from Evonik Resource Efficiency GmbH. An example of a suitable curing accelerator may be a substituted urea accelerator such as Omicure® U-52M (phenyl substituted urea) available from Emerald Performance Materials®.

The activatable material may also include one or more reinforcement components. Preferably the reinforcement components include a material that is generally non-reactive with the other components present in the activatable material. It is contemplated that the reinforcement components may also impart properties such as strength and impact resistance to the activatable material.

Examples of reinforcement components include wollastonite, silica, diatomaceous earth, glass, clay (e.g., including nanoclay), glass beads or bubbles, carbon or ceramic fibers, nylon, aramid or polyamide fibers, and the like. An example of a suitable filler may be a fumed silica such as CAB-O-SIL® TS-720 (polydimethylsiloxane surface treated fumed silica) available from Cabot Corporation.

When employed, the reinforcement components in the activatable material can range from 10% or less to 90% or greater by weight of the activatable material, but more typical from about 20 to 55% by weight of the activatable material. According to some embodiments, the activatable material may include from about 0% to about 30% by weight, and more preferably slightly less than 10% by weight reinforcement components.

Other additives, agents or performance modifiers may also be included in the activatable material as desired, including but not limited to a UV resistant agent, a flame retardant, a heat stabilizer, a colorant, a processing aid, a lubricant or the like.

It is contemplated that most nearly any additional chemicals, materials or otherwise may be added to the activatable material assuming they are suitable for the activatable material and suitable for a chosen application of the activatable material.

It is possible that the specific combination and relative amounts of one or more materials described herein, may assist in providing improved values for one or more tensile modulus, adhesion durability, T-peel, strain to failure, or lap shear (all post-activation). As another example, the combination of epoxy/elastomer adduct and epoxy/amine adduct may assist in imparting improved strain to failure rate and adhesion durability. The ratio of the epoxy/elastomer adduct to the epoxy/amine adduct is from about 1 to 9 parts epoxy/elastomer adduct to about 1 to 3 parts epoxy/amine adduct. The ratio of the epoxy/elastomer adduct to the epoxy/amine adduct may be from about 3 to 7 parts epoxy/elastomer adduct to about 1 to 3 parts epoxy/amine adduct. As another example, the combination of epoxy/elastomer adduct, and silane-modified epoxy resin may assist in imparting improved adhesion durability. The ratio of epoxy/elastomer adduct to silane-modified epoxy resin is about 1 to 10 parts epoxy/elastomer adduct to about 1 to 7 parts silane-modified epoxy resin. Another example is the combination of amine adduct and diacid adduct may improve peel resistance and impact resistance.

When determining appropriate components for the activatable material, it may be important to form the material such that it will only activate (e.g., flow, melt, cure or otherwise change states) at appropriate times or temperatures. For instance, in some applications, it is undesirable for the material to be reactive at room temperature or otherwise at the ambient temperature in a production environment. More typically, the activatable material becomes activated to flow and develop adhesion at higher exposure temperatures. As an example, temperatures such as those encountered in an automobile assembly plant may be appropriate, especially when the activatable material is processed along with the other components at elevated temperatures or at higher applied energy levels, e.g., during painting preparation steps. Temperatures encountered in many coating operations (e.g., in a paint and/or e-coat curing oven), for instance, range up to about 250° C. or higher.

Formation of the activatable material can be accomplished according to a variety of new or known techniques. Preferably, the activatable material is formed as a material of substantially homogeneous composition. However, it is contemplated that various combining techniques may be used to increase or decrease the concentration of certain components in certain locations of the activatable material.

According to another embodiment, the activatable material may be formed by heating one or more of the components that is generally easier to soften or liquidize such as the polymer-based materials to induce those components into a mixable state. Thereafter, the remaining components may then be intermixed with the softened components. The material may be compounded using a melt processing operation such as a twin screw, a double arm mixer, or a planetary mixer.

Depending upon the components used, it may be important to assure that the temperature of the components remains below certain activation temperatures that might cause the activatable material to cure prior to the intended cure time. In situations where it is desirable to maintain the activatable material at lower temperatures it may be desirable to maintain the components in a semi-solid or viscoelastic state using pressure or a combination of pressure and heat to intermix the components of the activatable material. Various machines have been designed to avoid applying heat, pressure or both to materials.

After formation of the activatable material, the material is typically applied to a surface and activated. When applied to a surface, the material may be in the form of a paste, a film, a solid extrudate, liquid, or a patch. The material may be applied by robotic application, which may be a robotic extrusion device.

It shall be understood that, depending upon the intended application, the activatable material may be applied and activated in different ways and at different times. Thus, exemplary uses of the activatable material are discussed below to illustrate preferred methodologies of application and activation of the activatable material. In particular, the activatable material may used for, amongst others, reinforcement, adhering, or the like.

According to one embodiment, it is contemplated that an activatable material according to the present teachings may be employed as a structural adhesive material. In such an embodiment, the material is typically activated and cured (e.g., at temperatures common to e-coat or automotive painting operations) to adhere to a first member and a second member. Contact with attachment surface of the first member and the second member may occur prior to or during activation and curing of the material. Examples of structural adhesive applications are disclosed in U.S. patents application Ser. Nos. 10/234,902; 10/386,287; 60/451,811, all of which are incorporated herein by reference for all purposes.

Certain activatable materials formed in accordance with the present teachings have exhibited post-activation tensile modulus greater than about 900 MPa, greater than about 1200 MPa, and even possibly greater than about 1500 MPa when determined in accordance with ASTM D638 Type IV test method. Moreover, the activatable material, post-activation, particularly when provided as a solid, is typically less susceptible to breakage (e.g., chipping or the like).

Certain activatable materials formed in accordance with the present teachings have exhibited post-activation lap shear strength greater than about 30 MPa, greater than about 35 MPa, and even possibly greater than 40 MPa when determined in accordance with ASTM D5868.

Certain activatable materials formed in accordance with the present teachings have exhibited post-activation strain to failure greater than about 1%, greater than about 5%, greater than 8%, and even possibly greater than 15%. The strain to failure was measured by performing a tensile test (ISO 527 for example) while using an extensometer to record the deformation that is then used to calculate the material strain.

Certain activatable materials formed in accordance with the present teachings have exhibited glass transition (TG) of greater than 80 degrees Celsius, greater than 85 degrees Celsius, and even greater than 90 degrees Celsius when determined by ASTM D7028-07. The glass transition temperature determined by this test method (referred to as Dynamic Mechanical Analysis Tg or "DMA Tg") may not be the same as that reported by other measurement techniques on the same test specimen. The test method is commonly used to determine upper use temperature for composite materials. FIG. 1 shows the storage modulus as a function of temperature for an exemplary material of the present teachings. The glass transition temperature is identified as the temperature at which the storage modulus begins a more rapid decrease.

For exemplary purposes, tables C through D are produced below to illustrate two exemplary formulations for forming the activatable material.

TABLE C

| Ingredient | Weight % |
|---|---|
| Epoxy/elastomer adduct | 19.17 |
| Polymeric particle | 10.87 |
| Epoxy/diacid adduct | 2.5 |
| Amine reaction product | 0.0 |
| DGEBF | 46.215 |
| Phenoxy resin | 1.625 |
| Silane-modified epoxy | 11.3 |
| Flexibilizer | 5.44 |
| Curing agent | 5.97 |
| Curing agent accelerator | 0.76 |
| Reinforcing Component | 1.00 |
| Filler (e.g. pigment) | 0.10 |
| Total | 100.00 |

TABLE D

| Ingredient | Weight % |
|---|---|
| Epoxy/elastomer adduct | 19.17 |
| Polymeric particle | 10.25 |
| Epoxy/diacid adduct | 2.5 |
| Amine reaction product | 3.0 |
| DGEBF | 40.205 |
| Phenoxy resin | 1.625 |
| Silane-modified epoxy | 9.98 |
| Flexibilizer | 5.44 |
| Curing agent | 5.97 |
| Curing agent accelerator | 0.76 |
| Reinforcing Component | 1.00 |
| Filler (e.g. pigment) | 0.10 |
| Total | 100.00 |

The comparative examples shown below demonstrate the change in physical properties based upon the inclusion/removal of certain components of the materials disclosed herein.

TABLE E

| | Sample 1 | Sample 2 | Sample 3 | Sample 4 |
|---|---|---|---|---|
| CTBN Adduct | 8.72 | | 8.72 | 8.72 |
| Silica | 1.00 | 1.00 | 1.00 | 1.00 |
| Diacid Adduct | 2.50 | 3.50 | 5.00 | |
| Phenoxy Resin | 1.625 | 2.18 | 1.62 | 1.625 |
| Polymeric Particle | 10.87 | 11.61 | 10.87 | 10.25 |
| Silane Modified Epoxy | 11.30 | 15.70 | 13.55 | 12.98 |
| Bisphenol F Epoxy | 46.215 | 41.18 | 41.27 | 42.705 |

TABLE E-continued

| | Sample 1 | Sample 2 | Sample 3 | Sample 4 |
|---|---|---|---|---|
| Urethane Based Flexibilizer | 5.44 | 6.00 | 5.44 | 5.44 |
| Polysulfide Adduct | 5.00 | 7.00 | | 5.00 |
| Epoxonic 328 Adduct | 5.45 | 5.00 | 5.45 | 5.45 |
| Curing Agent | 5.97 | 5.97 | 6.20 | 5.97 |
| Accelerator | 0.76 | 0.76 | 0.78 | 0.76 |
| Pigment | 0.10 | 0.10 | 0.10 | 0.10 |
| Total | 100.00 | 100.00 | 100.00 | 100.00 |
| Lap shear strength steel/steel (MPa)* | 42.7 | 39.9 | 36.3 | 43.3 |
| Lap shear strength steel/aluminum (MPa)** | 41.6 | 39.5 | 38.8 | 41.5 |
| Lap shear strength aluminum (MPa)*** | 42.5 | 36.6 | 36.1 | 38.9 |
| Lap shear strength after 21-day salt spray steel/steel (MPa)* | 32.1 | 33.8 | 30.2 | 21.1 |
| Lap shear strength after 21-day salt spray steel/aluminum (MPa)** | 32.9 | 29.4 | 24.5 | 24.5 |
| Lap shear strength after 21-day salt spray aluminum (MPa)*** | 30.2 | 25.2 | 14.8 | 19.7 |
| T-peel (N/mm)**** | 15.4 | 15.0 | 14.1 | 13.0 |
| Peak stress (MPa) | 36.5 | 35.3 | 33.2 | 36.1 |
| Modulus (MPa) | 1491 | 1580 | 1219 | 1561 |
| Elongation (%) | 21.5 | 14.0 | 15.7 | 12.8 |
| Wedge impact @ 22° C. - Energy (J) | 17.7 | 17.6 | 17.6 | 19.4 |
| Wedge impact @ 22° C. - Average peel load (N/mm) | 41.3 | 43.9 | 44.1 | 40.9 |
| Wedge impact @ −40° C. - Energy (J) | 18.1 | 16.4 | 17.4 | 17.6 |
| Wedge impact @ −40° C. - Average peel load (N/mm) | 43.5 | 38.0 | 42.0 | 37.0 |
| Tg (° C.) | 82.1 | 90.9 | 103 | 95.7 |

*0.060" EG60/0.060 EG60;
**0.060" EG60/0.080" Alu 6061;
***0.080" Alu/0.080" Alu 6061
****0.030" EG60

TABLE F

| | Sample 5 (control) | Sample 6 | Sample 7 | Sample 8 | Sample 9 | Sample 10 |
|---|---|---|---|---|---|---|
| CTBN Adduct | 8.72 | 8.72 | 8.72 | 8.72 | 8.72 | |
| Silica | 1.00 | 1.00 | 1.00 | 1.00 | 1.00 | 1.00 |
| Amine Reaction Product | | | 3.00 | 3.00 | 3.00 | 3.00 |
| Diacid Adduct | | 2.50 | 2.50 | | 2.50 | 2.50 |
| Phenoxy Resin | 1.625 | 1.625 | 1.625 | 1.625 | 1.625 | 1.625 |
| Polymeric Particle | 10.25 | 10.25 | 10.25 | 10.25 | | 10.25 |
| Silane Modified Epoxy | 12.98 | 12.98 | 9.98 | 12.48 | 12.48 | 9.98 |
| Bisphenol F Epoxy | 42.705 | 40.205 | 40.205 | 40.205 | 47.955 | 64.815 |
| Urethane Based Flexibilizer | 5.44 | 5.44 | 5.44 | 5.44 | 5.44 | |
| Polysulfide Adduct | 5.00 | 5.00 | 5.00 | 5.00 | 5.00 | |
| Epoxonic 328 Adduct | 5.45 | 5.45 | 5.45 | 5.45 | 5.45 | |
| Curing Agent | 5.97 | 5.97 | 5.97 | 5.97 | 5.97 | 5.97 |
| Accelerator | 0.76 | 0.76 | 0.76 | 0.76 | 0.76 | 0.76 |
| Pigment | 0.10 | 0.10 | 0.10 | 0.10 | 0.10 | 0.10 |
| Total | 100.00 | 100.00 | 100.00 | 100.00 | 100.00 | 100.00 |
| Lap shear strength steel/steel (MPa)* | 43.3 | 35.6 | 40.7 | 45.1 | 51.5 | 54.9 |
| Lap shear strength steel/aluminum (MPa)** | 41.5 | 36.4 | 39.8 | 42.9 | 44.7 | 45.4 |
| Lap shear strength aluminum (MPa)*** | 38.9 | 35.7 | 41.0 | 42.1 | 42.2 | 41.9 |
| Lap shear strength after 21-day salt spray steel/steel (MPa)* | 28.1 | 30.0 | 34.7 | 33.7 | 42.7 | 37.1 |

TABLE F-continued

| | Sample 5 (control) | Sample 6 | Sample 7 | Sample 8 | Sample 9 | Sample 10 |
|---|---|---|---|---|---|---|
| Lap shear strength after 21-day salt spray steel/aluminum (MPa)** | 24.5 | 28.9 | 33.0 | 31.3 | 30.1 | 25.4 |
| Lap shear strength after 21-day salt spray aluminum (MPa)*** | 19.7 | 36.5 | 29.9 | 28.6 | 13.1 | 15.8 |
| T-peel (N/mm)**** | 13.0 | 13.4 | 16.0 | 16.1 | 13.4 | 6.7 |
| Peak stress (MPa) | 36.1 | 37.8 | 39.4 | 39.6 | 39.3 | 61.8 |
| Modulus (MPa) | 1561 | 1545 | 1571 | 1657 | 1985 | 2559 |
| Elongation (%) | 12.8 | 15.9 | 14.7 | 14.1 | 2.7 | 3.6 |
| Wedge impact @ 22° C. - Energy (J) | 19.4 | 16.0 | 17.7 | 17.5 | 3.7 | 12.3 |
| Wedge impact @ 22° C. - Average peel load (N/mm) | 40.9 | 38.7 | 42.4 | 42.1 | 16.9 | 29.3 |
| Wedge impact @ −40° C. - Energy (J) | 17.6 | 17.4 | 17.4 | 16.1 | 0.6 | 3.7 |
| Wedge impact @ −40° C. - Average peel load (N/mm) | 37.0 | 39.6 | 41.2 | 37.2 | 3.8 | 13.6 |
| Tg (° C.) | 95.7 | 84.2 | 83.4 | 85.8 | 88.2 | 115.5 |

*0.060" EG60/0.060 EG60;
**0.060" EG60/0.080" Alu 6061;
***0.080" Alu/0.080" Alu 6061
****0.030" EG60

As shown in Table E, Sample 1 includes all components, but no amine reaction product. Sample 2 is free of the CTBN adduct and demonstrates lower elongation and reduced wedge impact resistance at −40° C. Sample 3 is free of the polysulfide adduct and demonstrates lower T-peel and reduced salt spray resistance for aluminum to aluminum bonding. Sample 4 is free of any diacid adduct and demonstrates reduced elongation.

As shown in Table F, Sample 5 is a control sample as compared to Samples 6-10, including no amine reaction product or diacid adduct. Sample 6 includes the diacid adduct. Sample 7 includes both amine reaction product and diacid adduct. Sample 8 includes only the amine reaction product. Sample 9 includes both amine reaction product and diacid adduct, but no polymeric particle. Sample 10 includes both amine reaction product and diacid adduct, but no polysulfide adduct, flexibilizer or Epoxonic adduct (e.g., no elastomeric materials). Sample 7 demonstrates the best physical properties. The presence of the amine adduct shows a significant improvement to T-peel. Both Samples 9 and 10 show reduced physical properties overall due to the lack of polymeric particles and elastomeric components, respectively.

As used herein, unless otherwise stated, the teachings envision that any member of a genus (list) may be excluded from the genus; and/or any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist of, or consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. An activatable material comprising:

i) at least two different epoxy/elastomer adducts;

ii) an epoxy/diacid adduct present in an amount of from about 0.05% to about 20% by weight of the material;

iii) a silane-modified epoxy resin;

iv) a phenol-terminated urethane-based toughening agent; and v) a calcium-based reinforcement component;

wherein a ratio of the at least two different epoxy/elastomer adducts to the epoxy/diacid adduct is about 3 parts of the at least two different epoxy/elastomer adducts to about 1 part of the epoxy/diacid adduct.

2. The activatable material of claim 1, having a post-activation T-peel strength of at least 14 N/mm.

3. The activatable material of claim 2, having a glass transition temperature as defined by ASTM D7028-07 of at least 80° C.

4. The activatable material of claim 3, wherein one of the at least two different epoxy/elastomer adducts is a polydisulfide polymer.

5. The activatable material of claim 1, having a post-activation strain to failure of greater than 8%.

6. The activatable material of claim 5, having a post-activation strain to failure of at least 16%.

7. The activatable material of claim 1, further comprising at least one amine reaction product.

8. The activatable material of claim 7, wherein the at least one amine reaction product is present in an amount of from about 0.01% to about 15% by weight of the material.

9. The activatable material of claim 7, wherein the at least one amine reaction product is present in a sufficient amount so that the material displays a post-activation T-Peel strength of about 6 N/mm to about 30 N/mm.

10. The activatable material of claim 7, wherein the at least one amine reaction product is 1-naphthylamine, 2-naphthylamine, ethanolamine, oleylamine, or combinations thereof.

11. The activatable material of claim 1, wherein at least one of the at least two different epoxy/elastomer adducts is present in an amount of at least about 5% but less than about 50% by weight of the material.

12. The activatable material of claim 1, wherein the epoxy/diacid adduct is present in an amount of from about 0.2% to about 15% by weight of the material.

13. The activatable material of claim 1, wherein the silane-modified epoxy resin is present in an amount of from about 8% to 15% by weight of the material.

14. The activatable material of claim 1, further comprising a curing agent.

15. The activatable material of claim 14, wherein the epoxy/diacid adduct is prepared from bisphenol-F diglycidyl ether (DGEBF) epoxy.

16. The activatable material of claim 14, having a post-activation modulus of at least 900 MPa.

17. The activatable material of claim 14, which exhibits a lap shear strength of at least about 20 MPa when cured.

18. The activatable material of claim 14, which exhibits a T-Peel strength of from about 6 N/mm to about 18 N/mm when cured.

19. The activatable material of claim 1, further comprising a curing agent in an amount of from about 2% to about 7% by weight of the material.

20. The activable material of claim 19, which exhibits a tensile modulus from about 900 MPa to about 1700 MPa when cured.

21. The activatable material of claim 1, further comprising one or more additional reinforcement components, which is silica, diatomaceous earth, glass, clay, glass beads, glass bubbles, carbon fibers, ceramic fibers, nylon fibers, aramid fibers, polyamide fibers, pyrophyllite, sauconite, saponite, nontronite, wollastonite, and montmorillonite, or combinations thereof.

* * * * *